US 011740978B2

(12) United States Patent
Sivakumar et al.

(10) Patent No.: US 11,740,978 B2
(45) Date of Patent: Aug. 29, 2023

(54) EDGED CLOUD APPLICATION BACKUP

(71) Applicant: International Business Machines Corporation, Armonk, NY (US)

(72) Inventors: Gandhi Sivakumar, Bentleigh (AU); Luke Peter Macura, Lucas (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 17/547,320

(22) Filed: Dec. 10, 2021

(65) Prior Publication Data

US 2023/0185672 A1 Jun. 15, 2023

(51) Int. Cl.
*G06F 12/00* (2006.01)
*G06F 11/14* (2006.01)
*G06F 16/11* (2019.01)
*H04L 67/00* (2022.01)

(52) U.S. Cl.
CPC ........ *G06F 11/1458* (2013.01); *G06F 16/128* (2019.01); *H04L 67/34* (2013.01)

(58) Field of Classification Search
CPC ............. G06F 11/1458; G06F 11/1446; G06F 16/128; G06F 3/065; H04L 67/34; H04L 41/00; H04W 4/00
See application file for complete search history.

(56) References Cited

U.S. PATENT DOCUMENTS

| 8,972,351 | B1 | 3/2015 | Kumar |
| 10,013,313 | B2 * | 7/2018 | Zhang ................. G06F 11/1435 |
| 10,664,357 | B1 | 5/2020 | Mallik |

(Continued)

FOREIGN PATENT DOCUMENTS

| CN | 108733516 A | 11/2018 |
| CN | 112579354 A | 3/2021 |

OTHER PUBLICATIONS

"Patent Cooperation Treaty PCT Notification of Transmittal of the International Search Report and the Written Opinion of the International Searching Authority, or the Declaration", Applicant's file reference F22W2988, International application No. PCT/CN2022/133178, International filing date Nov. 21, 2022, dated Feb. 2, 2023, 7 pages.

(Continued)

*Primary Examiner* — Shawn X Gu
(74) *Attorney, Agent, or Firm* — Sonny Z. Zhan; Haley J. McClory

(57) ABSTRACT

In an approach for in-band selective data snapshot using fifth generation (5G) radio link control (RLC) channels for edged cloud application backups, a processor creates one or more RLC channels to transfer network data packets in a telecommunication network using a network slicing technology. A processor allocates the one or more RLC channels to one or more applications in a user device for dedicated packet routing requirements. A processor maps the corresponding RLC channels and applications with corresponding identifiers, respectively. A processor monitors the one or more applications for backups. A processor, in response to receiving an application's backup request, creates a copy of a datastore associated with the application based on changes monitored in the one or more applications.

20 Claims, 10 Drawing Sheets

(56) References Cited

U.S. PATENT DOCUMENTS

2015/0235240 A1 8/2015 Chang
2017/0331577 A1* 11/2017 Parkvall .................. H04W 4/00
2021/0014177 A1 1/2021 Kasichainula

OTHER PUBLICATIONS

"Backup and restore methods with FlashCopy® and snapshots", IBM Documentation, Printed Jun. 18, 2021, 3 pages, <https://www.ibm.com/docs/en/sps/8.1.11?topic=SSERFV_8.1.11/ fcm.unx/c_fcmu_db2_ovr_bupgranular.html>.

"IoT: Understanding the shift from cloud to edge computing", Internet of Business, printed Aug. 3, 2021, 9 pages, <https://internetofbusiness.com/shift-from-cloud-to-edge-computing/>.

"Why Edge Computing is Key to a 5G Future", Western Digital, Jul. 26, 2018, 6 pages, <https://datamakespossible.westerndigital.com/edge-computing-key-5g-future/>.

Bryson, Sean, "5G Technology Needs Edge Computing Architecture", Cisco, Printed Aug. 3, 2021, 7 pages, <https://www.cisco.com/c/en/us/solutions/enterprise-networks/edge-computing-architecture-5g.html>.

Chirivella-Perez et al., "Orchestration Architecture for Automatic Deployment of 5G Services from Bare Metal in Mobile Edge Computing Infrastructure", Hindawi Wireless Communications and Mobile Computing, vol. 2018, Article ID 5786936, Nov. 22, 2018, 18 pages, <https://www.researchgate.net/publication/329145298>.

Gohar et al., "TRILL-Based Mobile Packet Core Network for 5G Mobile Communication Systems", Wireless Personal Communications, Aug. 2015, 23 pages, <https://www.researchgate.net/publication/283165294>.

Yengar et al., "5G at the Edge", IBM, Nov. 12, 2020, 11 pages, <https://www.ibm.com/cloud/blog/5g-at-the-edge>.

Johnston et al., "FCC Technological Advisory Council 5G IoT Working Group", 5G Edge Computing Whitepaper, printed Aug. 3, 2021, 12 pages, <https://transition.fcc.gov/bureaus/oet/tac/tacdocs/reports/2018/5G-Edge-Computing-Whitepaper-v6-Final.pdf>.

Li, Derek, "Scale 5G with edge computing", Red Hat Blog, May 23, 2021, 12 pages, <https://www.redhat.com/en/blog/scale-5g-edge-computing>.

Mell et al., "The NIST Definition of Cloud Computing", National Institute of Standards and Technology, Special Publication 800-145, Sep. 2011, 7 pages.

Rash, Wayne, "IT Needs to Start Thinking About 5G and Edge Cloud Computing", PC Mag, Feb. 7, 2018, 10 pages, <https://in.pcmag.com/feature/119014/it-needs-to-start-thinking-about-5g-and-edge-cloud-computing>.

* cited by examiner

EDGED CLOUD APPLICATION BACKUP

BACKGROUND

The present disclosure relates generally to the field of application backups, and more particularly to in-band selective data snapshot using fifth generation (5G) radio link control (RLC) channels for edged cloud application backups.

In telecommunications, 5G is the fifth-generation technology standard for broadband cellular networks. 5G networks are cellular networks, in which the service area is divided into small geographical areas called cells. All 5G wireless devices in a cell are connected to the Internet and telephone network by radio waves through a local antenna in the cell. The main advantage of the new networks is that they will have greater bandwidth, giving higher download speeds, eventually up to 10 gigabits per second. Due to the increased bandwidth, the 5G networks may increasingly be used as general internet service providers for laptops and desktop computers and may make possible new applications in internet-of-things (IoT) and machine-to-machine areas.

Edge computing is delivered by computing servers closer to the ultimate user. Edge computing may reduce latency and data traffic congestion. One definition of edge computing is any type of computer program that delivers low latency nearer to the requests. Edge computing may be defined as broadly as all computing outside the cloud happening at the edge of the network, and more specifically in applications where real-time processing of data is required. Cloud computing may operate on big data while edge computing may operate on "instant data" that is real-time data generated by sensors or users. A data store may be a repository for persistently storing and managing collections of data which include not just repositories like databases, but also simpler store types such as simple files, emails etc.

SUMMARY

Aspects of an embodiment of the present disclosure disclose an approach for in-band selective data snapshot using fifth generation (5G) radio link control (RLC) channels for edged cloud application backups, a processor creates one or more RLC channels to transfer network data packets in a telecommunication network using a network slicing technology. A processor allocates the one or more RLC channels to one or more applications in a user device for dedicated packet routing requirements. A processor maps the corresponding RLC channels and applications with corresponding identifiers, respectively. A processor monitors the one or more applications for backups. A processor, in response to receiving an application's backup request, creates a copy of a datastore associated with the application based on changes monitored in the one or more applications.

DETAILED DESCRIPTION

Figure 1:
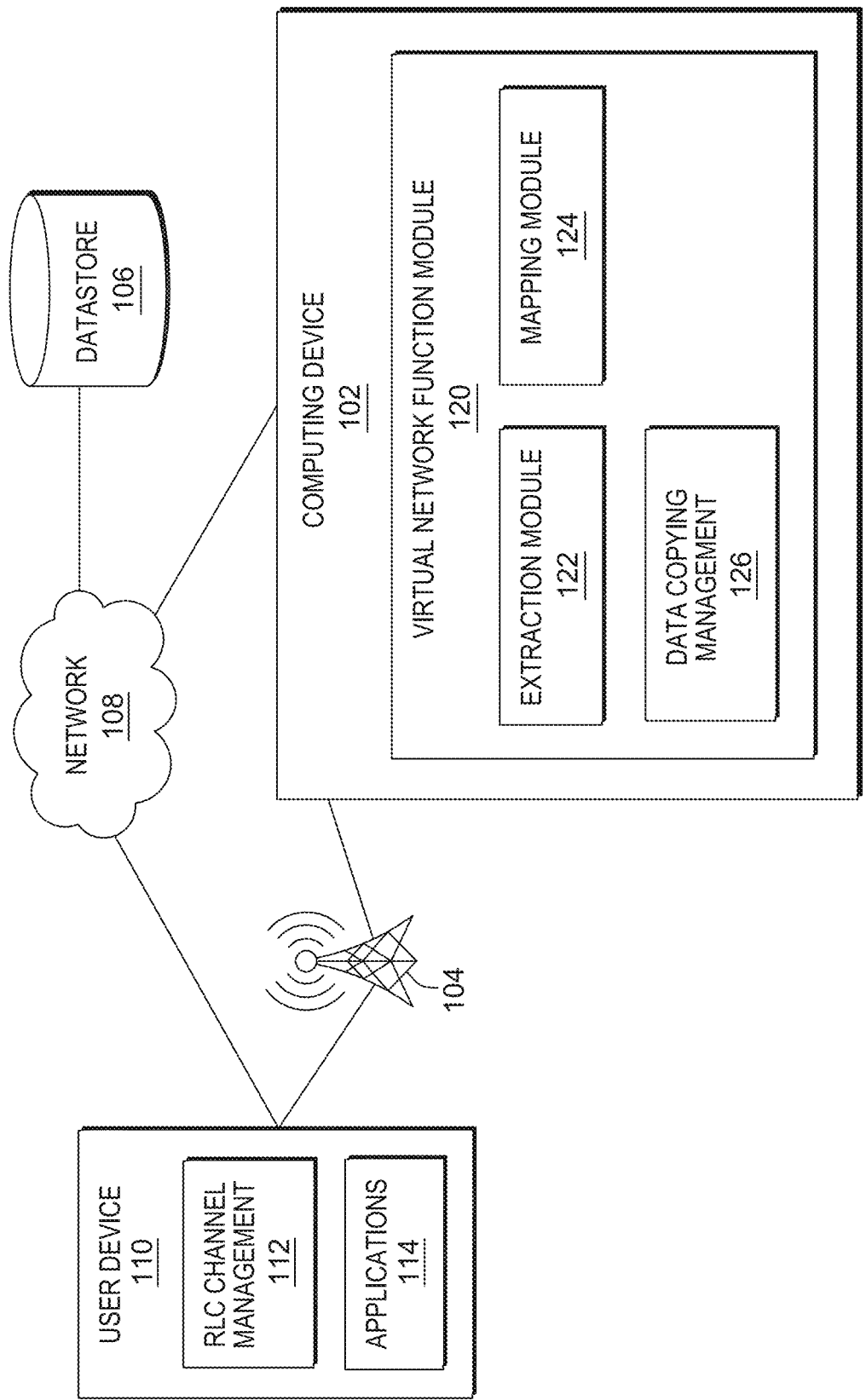
FIG. 1 is a functional block diagram illustrating an edged cloud application backup environment in accordance with an embodiment of the present disclosure.

The present disclosure is directed to systems and methods for in-band selective data snapshot using fifth generation (5G) radio link control (RLC) channels for edged cloud application backups.

Embodiments of the present disclosure recognize a need for providing effective application snapshot management in a 5G telecommunication network. The snapshot technology may offer to create multiple copies of data that can be used to restore the contents in case the latest copy detects failures or application-level inconstancy. Additionally, the snapshot may help for additional purposes like testing of a new version of the application with dummy data which is captured on older snapshots. Embodiments of the present disclosure disclose offering an application data snapshot in application controllable selective fashion. Embodiments of the present disclosure disclose that the applications control the selective elements that participate into the remote snapshots based on defined policies. Embodiments of the present disclosure discloses engaging logical RLC channels to identify the snapshot requirement at an internal 5G core cloud network. Embodiments of the present disclosure discloses monitoring on the applications that need snapshot and accordingly managing to trigger, restore, and detail the chain element operations using virtual network function calls. When any application's snapshot is triggered, an empty datastore is created and all further upcoming changes are tracked. Once any new write packet comes to the same application datastore, the old data grain is moved to a copy datastore and the incoming packet data may be written to the original location.

Embodiments of the present disclosure disclose methods and systems that work with 5G radio link control channel management and payload processing at end user devices and provide a way for selective snapshot of applications based on the radio link control channel parameter handshake. Embodiments of the present disclosure disclose a thin device driver layer implemented in an end user system that has knowledge of the applications and the RLC channel mapping for the applications. Embodiments of the present disclosure disclose creating multiple radio link control channels from an end user device and allocating multiple radio link control channels to the applications for dedicated packet routing requirements. Embodiments of the present disclosure disclose using multiple radio link control channels to determine snapshots on the data grains at the virtual network function of a 5G telecom network. Embodiments of the present disclosure disclose the virtual network function of a 5G network that keeps the allowed list of snapshot enabled channels which are communicating from a radio interface and extended to a bearer (e.g., S1 bearer) as well. The S1 bearer may provide connectivity between a base station (e.g., evolved node B or eNoteB) and home serving gateway. eNoteB may be a hardware that is connected to the mobile phone network that communicates directly wirelessly with mobile handsets, like a base transceiver station in networks. The virtual network function may keep the map of all the logical IDs for which the application-level snapshot is activated and accordingly triggers the first (e.g., denoted as T0) data copy management for core/edged clouds when any new write packet is received for the respective application. The end user level instance may manage all the applications that are subscribed to the selective space saving snapshot (e.g., FlashCopy) of 5G applications and routing of the incoming packets to a service data adaption protocol (SDAP) layer is managed. When the application packet reaches to the SDAP layer at an end user device, the application packet may first check the workload type as read or write. Data-read operation over network doesn't impact on internal copies hence the internal copies can be routed to usual paths. In case the application is writing some data to remote datastore allocation, then the instance in the end user device enquires the copy management requirement of the application for the received grain-pack. The application may keep the application's own data structure with the defined policies for certain data having snapshot (e.g., FlashCopy) requirement as yes or no. This information will be applied in case of application-level radio link control channels. In case of a system without a base operating system or installed applications (e.g., BareMetal) allocation of the radio link control channels, the packet data may be handed over to the SDAP along with additional system flag indicating the requirement of the copy management action on the internal cloud systems.

Embodiments of the present disclosure disclose, in the application-level packet transmission approach, an RLC channel selection that may be performed by the application based on whether the initiated write pack needs data preservation or not. If the data position which is newly written is not important to track the changes, then the RLC channel selection may select a designated non-trackable RLC channel for the packet. The packet may be submitted to the RLC layer with a defined RLC identifier which may have setting of not tracking the changes for application-level snapshot at the cloud. On the other hand, if the application is writing sensitive information which must be tracked, then the packet may be wrapped with designated RLC headers with the defined identifiers for tracking enablement. In case of BareMetal channel allocation policy, once the message and packet are deceived at SDAP, the RLC channel selection may select the RLC instance based on the nature of tracking requirement and old data preservation polices submitted to SDAP by application over platform interfaces.

Embodiments of the present disclosure disclose creating RLC channels. Embodiments of the present disclosure disclose exchanging additional parameters for tracking state which will be saved by each party participating in the communication. When any write packet is received by a virtual network function, the write packet may extract the application identifier and the respective RLC channel identifier from the packet headers. Once the channel identifiers are located, these identifiers may be mapped with the local virtual network function data structure for tracking enablement. If the RLC identifier is detected for tracing enablement, then source data may be overwritten with new application data and the original data may be saved to the target datastore. Source and target copies can be used by different applications for different purposes. In this case, as the specific RLC channel is designed to send the data to the datastore, therefore the data tracking is calculated and Flash-Copy for respective grains are updated by copy data management system at virtual network function. Additionally, chaining and tracking of the application data may be enabled. The virtual network function may understand the SADP header about the RLC identifier that belongs to the list for which the data needs to be tacked in the dependency chaining. On the other hand, the data which is not important and does not need copy data management may be received on another set of RLC channels. In such cases, the data blocks are discarded and new data may be saved at the same grain position as earlier without invocation of copy data management system. As the data is not moved to another store, the data saves the storage requirement for the datastore that gives space benefits for the remote storage for managing the application data. Additionally, embodiments of the present disclosure disclose saving computational requirement to manage dependency chaining between the datastore objects during addition/removal of intermediate objects and improves the effectiveness of virtual network function copy management function with optimization in overall workload using 5G's RLC tunneling for application write packs.

Embodiments of the present disclosure disclose removing the starvation of the important application data traffic as correct set of data is moved to the edged cloud with correct snapshot requirements. Embodiments of the present disclosure disclose providing pleasant user experience with storage space saving in a telecommunication network. Embodiments of the present disclosure disclose enabling a user defined way to control the edged computing benefited for the applications. Embodiments of the present disclosure disclose a cognitive system enablement for additional information capture in cloud and user-based service propagation.

Embodiments of the present disclosure disclose controlling the selective elements that participate into the remote snapshots based on defined policies. Embodiments of the present disclosure disclose selectively controlling the data to the internal elements managed by virtual network functions which have no access over radios. Embodiments of the present disclosure disclose exchanging additional parameters for tracking state which is saved by each party participating in the communication. Embodiments of the present disclosure disclose maintaining the map of all the logical ids for which the application-level snapshot is activated.

The present disclosure will now be described in detail with reference to the Figures. FIG. 1 is a functional block diagram illustrating an edged cloud application backup environment, generally designated 100, in accordance with an embodiment of the present disclosure.

In the depicted embodiment, edged cloud application backup environment 100 includes computing device 102, base station 104, user device 110, datastore 106, and network 108. In one or more embodiments of the present disclosure, base station 104 can be a node in a telecommunication network. In an example, the telecommunication network can be a 5G network. In an example, base station 104 can be called as evolved node B or eNodeB. Base station 104 may be an essential part of a radio network and may perform network control functions in addition to creating mobile network coverage. In the depicted example, only one base station is shown. However, in other examples, there can be many and multiple base stations in a telecommunication network. In an example, a S1 bearer (not shown) may provide connectivity between base station 104 and a serving gateway.

In one or more embodiments of the present disclosure, datastore 106 may be a repository for storing and managing collections of data. In an example, datastore 106 may be a database or a repository of a database. In an example, datastore 106 may store data from user device 110 and computing device 102. In the depicted embodiment, datastore 106 is located externally and accessed through a communication network such as network 108. However, in other embodiments, datastore 106 may be located on user device 110 and computing device 102. In an embodiment, datastore 106 may store snapshot backups or other suitable backups (e.g., FlashCopy®). In an example, snapshot backups can be either full copy snapshots or space-efficient snapshots. The type of snapshot backups may depend on the storage environment. During a full copy snapshot, all blocks of data on the source volume may be copied to the target volume. During a space efficient snapshot, only blocks of data that are written on the source volume after the snapshot was created may be copied to the target volume.

In various embodiments of the present disclosure, user device 110 can be a laptop computer, a tablet computer, a netbook computer, a personal computer (PC), a desktop computer, a mobile phone, a smartphone, a smart watch, a wearable computing device, or a personal digital assistant (PDA), or a server. In an embodiment, user device 110 is a mobile device. In general, user device 110 can be any computing device or a combination of devices with access to network 108 and may communicate with base station 104. User device 110 may include internal and external hardware components, as depicted and described in further detail with respect to FIG. 8.

Further, in the depicted embodiment, user device 110 includes RLC channel management 112 and application(s) 114. In the depicted embodiment, RLC channel management 112 and application(s) 114 are located on user device 110. However, in other embodiments, RLC channel management 112 and application(s) 114 may be located externally and accessed through a communication network such as network 108. In one or more embodiments, RLC channel management 112 is configured to manage in-band selective data snapshot using RLC channels for in edged cloud application backups. RLC channel management 112 may provide a way for selective snapshot of applications based on the RLC channel parameter handshake. RLC channel management 112 may include a thin device driver layer implemented in user device 110 that has knowledge of applications 114 and the RLC channels mapping for applications 114. RLC channel management 112 may provide services to the RLC layer controls in the form of logical channels. These logical channels are virtualized communication network interface that is used to transfer input/output commands (network data packets) and control instructions over radio interface and network 108. A logical channel may be defined by the type of information that the logical channel carries. In an example, a logical channel may be a control channel, used for transmission of control and configuration information. In another example, a logical channel may be a traffic channel used for the user data. RLC channel management 112 may create multiple logical channels over a single radio bearer network using the network slicing models. RLC channel management 112 may use the logical channels to carry a specialized traffic from user device 110 to network 108. RLC channel management 112 may create multiple channels from a single device (e.g., user device 110) to network 108. RLC channel management 112 may deliver the channels in parallelism in the packet transmission as well as RLC channel management 112 may reduce the exclusive locking of the network resources that give performance benefits. RLC channel management 112 may generate multiple RLC channels and allocate the multiple RLC channels to applications 114 for dedicated packet routing requirements. RLC channel management 112 may determine snapshots (e.g., FlashCopy®) of the data grains at the virtual network function of network 108.

In various embodiments of the present disclosure, computing device 102 can be a laptop computer, a tablet computer, a netbook computer, a PC, a desktop computer, a mobile phone, a smartphone, a smart watch, a wearable computing device, a PDA, or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to virtual network function module 120 and network 108 and is capable of processing program instructions and executing virtual network function module 120, in accordance with an embodiment of the present disclosure. Computing device 102 may include internal and external hardware components, as depicted and described in further detail with respect to FIG. 8.

Further, in the depicted embodiment, computing device 102 includes virtual network function module 120. In the depicted embodiment, virtual network function module 120 is located on computing device 102. However, in other embodiments, virtual network function module 120 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and virtual network function module 120, in accordance with a desired embodiment of the disclosure.

In one or more embodiments, virtual network function module 120 is configured to create one or more RLC channels to transfer network data packets in network 108 using a network slicing technology. In an example, a network slicing may be a network architecture that enables the multiplexing of virtualized and independent logical networks on the same physical network infrastructure. Each network slice may be an isolated end-to-end network tailored to fulfil diverse requirements requested by a particular application. In an example, the RLC channels are logical channels of virtualized communication network interface that is used to transfer input/output commands (network data packets) and control instructions over radio interface and network 108. A logical channel may be defined by the type of information that the logical channel carries. In an example, a logical channel may be as a control channel, used for transmission of control and configuration information. In another example, a logical channel may be as a traffic channel used for the user data. Virtual network function module 120 may create multiple logical channels over a single radio bearer network using network slicing models. These channels are used to carry a specialized traffic from user device 110 to network 108. As multiple channels are created from a single device to network 108, the channels deliver parallelism in the packet transmission as well as reduce the exclusive locking of network resources that give performance benefits.

Virtual network function module 120 may exchange additional parameters for tracking state which will be saved by each party participating in the communication. Virtual network function module 120 may keep the allowed list of snapshots enabled channels which are communicating from radio interface and extended to S1 bearer as well. Virtual network function module 120 may keep the map of all the logical identifiers for which the application-level snapshot (e.g., FlashCopy®) is activated and accordingly may trigger data copy management for core/edged clouds when any new write packet is received for the respective application. Virtual network function module 120 may manage all the applications that are subscribed to the selective space saving FlashCopy® of applications 114 and routing of the incoming packets to a service data adaptation protocol (SDAP) layer. A SDAP layer may be responsible for mapping between a quality-of-service flow from a 5G core network and a data radio bearer, as well as marking the quality-of-service flow identifier in uplink and downlink packets. In telecommunications, bearer service or data service may be a service that allows transmission of information signals between network interfaces. These services give the subscriber the capacity required to transmit appropriate signals between certain access points, i.e., user network interfaces.

Virtual network function module 120 may activate processing network data and control protocol data units. Virtual network function module 120 may activate respective list of RLC channels for selective point-in time data copy for application data. Virtual network function module 120 may create data traffic channels. Virtual network function module 120 may open RLC channels from user device 110 and may issue application binding associated with the respective RLC channels. Virtual network function module 120 may initiate a thin device driver layer in user device 110 that will have knowledge of applications 114 and the RLC channel mapping for applications 114.

In one or more embodiments, virtual network function module 120 is configured to allocate one or more RLC channels to applications 114 in user device 110. Virtual network function module 120 may allocate multiple RLC channels to applications 114 for dedicated packet routing requirements. Virtual network function module 120 may use multiple RLC channels to determine snapshots on the data grains at the virtual network function of network 108. Virtual network function module 120 may control the selective elements in applications 114 that participate into the remote snapshots based on defined policies. Virtual network function module 120 may identify the snapshot requirements at network 108 (e.g., an internal 5G core cloud network). Virtual network function module 120 may remove the starvation of the important application data traffic as correct set of data is moved to the edged cloud with correct snapshot requirements. Virtual network function module 120 may provide user experience with storage space saving in network 108 (e.g., an 5G core cloud network). Virtual network function module 120 may enable a user defined way to control the edged computing benefited for applications 114. Virtual network function module 120 may control the selective elements that participate into the remote snapshots based on defined policies. Virtual network function module 120 may selectively control the data to the internal elements managed by virtual network functions which has no access over radios. Virtual network function module 120 may allocate multiple RLC channels to applications 114 for dedicated packet routing requirements. Virtual network function module 120 may select RLC channels to get the decision of snapshots (e.g., FlashCopy®) of the data grains at the virtual network function of network 108 (e.g., a 5G telecommunication network). Virtual network function module 120 may keep the allowed list of snapshots enabled channels which are communicating from radio interface and extended to S1 bearer.

In one or more embodiments, virtual network function module 120 is configured to map corresponding RLC channels and applications 114 with corresponding identifiers respectively. Virtual network function module 120 may maintain the map of all the logical identifiers for which the application-level snapshot is activated. When any write packet is received by a virtual network function, the write packet may extract the application identifier and the respective RLC channel identifier from the packet headers. Once the channel identifiers are located, these identifiers may be mapped with the local virtual network function data structure for tracking enablement. If the RLC identifier is detected for tracking enablement, then source data may be overwritten with new application data and the original data may be saved to datastore 106. Source and target copies can be used by different applications for different purposes. In this case, as the specific RLC channel is designed to send data to datastore 106, therefore the data tracking is calculated and FlashCopy for respective grains are updated by copy data management system at virtual network function. Additionally, chaining and tracking of the application data may be enabled as the virtual network function may understand the SADP header about the RLC identifier that belongs to the list for which the data needs to be tracked in the dependency chaining. On the other hand, the data which is not important and does not need copy data management may be received on another set of RLC channels. In such cases, the initial (e.g., denoted as TO) data blocks may be discarded, and new data may be saved at the same grain position as earlier without invocation of copy data management system. As the TO data is not moved to another store, the TO data saves the storage requirement for datastore 106 that gives space benefits for the remote storage for managing the application data. Additionally, virtual network function module 120 may save computational requirement to manage dependency chaining between the datastore objects during addition/removal of intermediate objects and may improve the effectiveness of virtual network function copy management function with optimization in overall workload using a RLC channel for application write packs.

In one or more embodiments, virtual network function module 120 is configured to monitor applications 114 that need snapshots. Virtual network function module 120 may manage to trigger, restore, and detail the chain element operations using virtual network function calls. When any application's snapshot is triggered, an empty datastore is created and all further upcoming changes are tracked. Once any new write packet comes to the same application datastore, the old data grain is moved to a copy datastore and the incoming packet data may be written to the original location. Virtual network function module 120 may keep the map of all the logical identifiers for which the application-level snapshot is activated and accordingly may trigger the first (e.g., denoted as TO) data copy management for core/edged clouds when any new write packet is received for the respective application. The end user level instance may manage all the applications 114 that are subscribed to the selective space saving snapshot (e.g., FlashCopy) of applications 114 and routing of the incoming packets to a SDAP layer. When the application packet reaches to the SDAP layer at user device 110, virtual network function module 120 may first check the workload type as read or write. In case the application is writing some data to remote datastore allocation, then the instance in user device 110 enquires the copy management requirement of the application for the received grain-pack. Virtual network function module 120 may keep the application own data structure with the defined policies for certain data having snapshot requirements. This information will be applied in case of application-level radio link control channels. Virtual network function module 120 may apply the application own data structure to application-level RLC channels. In case of a system without a base operating system or installed applications (e.g., BareMetal), virtual network function module 120 may allocate the RLC channels of the packet data to a SDAP along with additional system flag indicating the requirement of the copy management action on the internal cloud systems.

In one or more embodiments, virtual network function module 120 is configured to create a copy of a datastore associated with applications 114 based on changes monitored in the applications, in response to an application's snapshot request. Virtual network function module 120 may perform RLC channel selection by applications 114 based on whether an initiated pack write needs data preservation or not. For example, if the data position which is newly written is not important to track the changes, then virtual network function module 120 may perform RLC channel selection with a designated non-trackable RLC channel for the packet. Virtual network function module 120 may submit the packet to the RLC layer with the defined RLC identifier which has setting of not tracking the changes for application-level snapshot (e.g., FlashCopy) at the cloud. Virtual network function module 120 may determine whether applications 114 write information that must be tracked. If virtual network function module 120 determines that applications 114 write information that must be tracked, virtual network function module 120 may wrap the packets with designated RLC headers with defined identifiers for tracking enablement. Upon reception of any write packet, virtual network function module 120 may extract application identifiers and respective RLC channel identifiers from the packet headers. Virtual network function module 120 may map RLC channel identifiers with the local data structure for tracking enablement. Virtual network function module 120 may determine whether a RLC channel identifier matches for tracking enablement. If virtual network function module 120 determines that the RLC channel identifier matches for tracking enablement, virtual network function module 120 may overwrite source data with new application data in datastore 106. Virtual network function module 120 may save the original data to the target data in datastore 106. Virtual network function module 120 may activate data tracking and update respective grains. Virtual network function module 120 may perform copy on write. Virtual network function module 120 may deliver an acknowledge to source datastore 106. In case of BareMetal channel allocation policy, once the message and packet is deceived at the SDAP layer, virtual network function module 120 may select the RLC instance based on the nature of tracking requirement and old data preservation polices submitted to the SDAP layer over platform interfaces.

Further, in the depicted embodiment, virtual network function module 120 includes extraction module 122, mapping module 124, and data copying module 126. In the depicted embodiment, extraction module 122, mapping module 124, and data copying module 126 are located on computing device 102 and virtual network function module 120. However, in other embodiments, extraction module 122, mapping module 124, and data copying module 126 may be located externally and accessed through a communication network such as network 108. In one or more embodiments, extraction module 122 is configured to extract an application identifier and respective RLC channel identifier from packet headers when virtual network function module 120 receives any write packet. Extraction module 122 may locate the RLC channel identifier. Extraction module 122 may validate async event request. Extraction module 122 may extract a write or write type of information from a data packet received. Extraction module 122 may detect a RLC channel identifier for tracing enablement. Extraction module 122 may overwrite new application data and may save the original data to the target datastore target. Source and target copies can be used by different applications for different purposes. Extraction module 122 may calculate the data tracking as the specific RLC channel may send the data to datastore 106. Extraction module 122 may enable chaining and tracking of the application data. Extraction module 122 may recognize a SDAP header about the RLC identifier that belongs to the list for which the data needs to be tracked in the dependency chaining. On the other hand, the data which is not important and does not need to be copied can be allocated to another set of RLC channels. In such cases, the original (e.g., denoted as TO) data blocks may be discarded, and new data can be saved at the same grain position as earlier without invocation of the copy data management system. As the TO data is not moved to another store, extraction module 122 may save the storage requirement for datastore 106 that gives space benefits for the remote storage for managing the application data.

In one or more embodiments, mapping module 126 is configured to map corresponding RLC channels and applications 114 with corresponding identifiers respectively. Mapping module 126 may maintain the map of all the logical identifiers for which the application-level snapshot is activated. When any write packet is received by a virtual network function, the write packet may extract the application identifier and the respective RLC channel identifier from the packet headers. Once the channel identifiers are located, the channel identifiers may be mapped with the local virtual network function data structure for tracking enablement. If a RLC identifier is detected for tracking enablement, then source data may be overwritten with new application data and the original data may be saved to datastore 106. Source and target copies can be used by different applications for different purposes. In this case, as the specific RLC channel is designed to send data to datastore 106, therefore the data tracking is calculated, and respective grains are updated by copy data management system at virtual network function. Additionally, mapping module 126 may enable chaining and tracking of the application data. Mapping module 126 may recognize the SADP header about the RLC identifier that belongs to the list for which the data needs to be tracked in the dependency chaining. On the other hand, mapping module 126 may allocate another set of RLC channels to the application data which is not important and does not need to be copied. In such cases, the t0 data blocks may be discarded and new data may be saved at the same grain position as earlier without invocation of the copy data management system. As the T0 data is not moved to another store, the T0 data saves the storage requirement for datstore0_tx that gives space benefits for the remote storage for managing the application data. Additionally, embodiments of the present disclosure disclose saving computational requirement to manage dependency chaining between the datastore objects during addition/removal of intermediate objects and improves the effectiveness of virtual network function copy management function with optimization in overall workload using the RLC channels for application write packs.

In one or more embodiments, data copying module 128 is configured to create a copy of a datastore associated with applications based on changes monitored in the applications, in response to an application's snapshot request. Data copying module 128 may perform RLC channel selection by applications 114 based on whether an initiated pack write needs data preservation or not. For example, if the data position which is newly written is not important to track the changes, then data copying module 128 may perform RLC channel selection with a designated non-trackable RLC channel for the packet. Virtual network function module 120 may submit the packet to the RLC layer with a defined RLC identifier which has a setting of not tracking the changes for application-level snapshot (e.g., FlashCopy) at the cloud. Data copying module 128 may determine whether applications 114 write information that must be tracked. If data copying module 128 determines that applications 114 write information that must be tracked, data copying module 128 may wrap the packet with the designated RLC headers with the defined identifiers for tracking enablement. Upon reception of any write packet, virtual network function module 120 may extract application identifiers and respective RLC channel identifiers from the packet headers. Virtual network function module 120 may map RLC channel identifiers with the local data structure for tracking enablement. Data copying module 128 may determine whether a RLC channel identifier matches for tracing enablement. If data copying module 128 determines that the RLC channel identifier matches for tracing enablement, data copying module 128 may overwrite source data with new application data in datastore 106. Data copying module 128 may save the original data to the target data in datastore 106. Data copying module 128 may activate data tracking and may update respective grains. Data copying module 128 may perform copy on write. Data copying module 128 may deliver an acknowledge to source datastore 106. In case of BareMetal channel allocation policy, once the message and packet are deceived at the SDAP layer, data copying module 128 may select the RLC instance based on the nature of tracking requirement and old data preservation polices submitted to the SDAP by application over platform interfaces.

Figure 2:
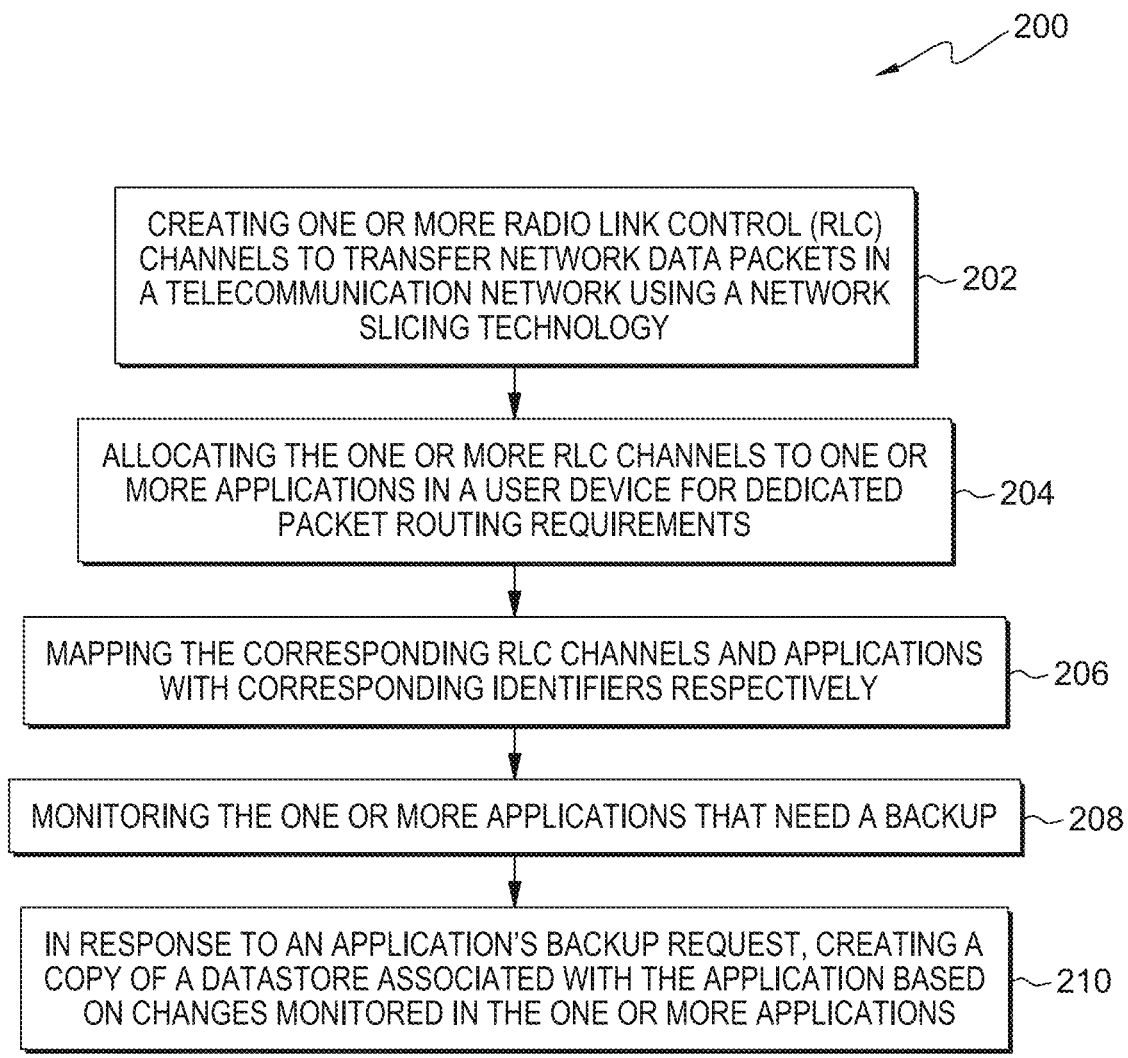
FIG. 2 is a flowchart depicting operational steps of a virtual network function module within a computing device of FIG. 1 in accordance with an embodiment of the present disclosure.

FIG. 2 is a flowchart 200 depicting operational steps of virtual network function module 120 in accordance with an embodiment of the present disclosure.

Virtual network function module 120 operates to create one or more RLC channels to transfer network data packets in network 108 using a network slicing technology. Virtual network function module 120 also operates to allocate one or more RLC channels to applications 114 in user device 110. Virtual network function module 120 operates to map corresponding RLC channels and applications 114 with corresponding identifiers respectively. Virtual network function module 120 operates to monitor applications 114 that need snapshots. Virtual network function module 120 operates to create a copy of a datastore associated with applications 114 based on changes monitored in the applications, in response to an application's snapshot request.

In step 202, virtual network function module 120 creates one or more RLC channels to transfer network data packets in network 108 using a network slicing technology. In an example, a network slicing may be a network architecture that enables the multiplexing of virtualized and independent logical networks on the same physical network infrastructure. Each network slice may be an isolated end-to-end network tailored to fulfil diverse requirements requested by a particular application. In an example, the RLC channels are logical channels of virtualized communication network interface that is used to transfer input/output commands (network data packets) and control instructions over radio interface and network 108. A logical channel may be defined by the type of information that the logical channel carries. In an example, a logical channel may be as a control channel, used for transmission of control and configuration information. In another example, a logical channel may be as a traffic channel used for the user data. Virtual network function module 120 may create multiple logical channels over a single radio bearer network using network slicing models. These channels are used to carry a specialized traffic from user device 110 to network 108. As multiple channels are created from a single device to network 108, the channels deliver parallelism in the packet transmission as well as reduce the exclusive locking of network resources that give performance benefits.

Virtual network function module 120 may exchange additional parameters for tracking state which will be saved by each party participating in the communication. Virtual network function module 120 may keep the allowed list of snapshots enabled channels which are communicating from radio interface and extended to S1 bearer as well. Virtual network function module 120 may keep the map of all the logical identifiers for which the application-level snapshot (e.g., FlashCopy®) is activated and accordingly may trigger data copy management for core/edged clouds when any new write packet is received for the respective application. Virtual network function module 120 may manage all the applications that are subscribed to the selective space saving FlashCopy® of applications 114 and routing of the incoming packets to a service data adaptation protocol (SDAP) layer. A SDAP layer may be responsible for mapping between a quality-of-service flow from a 5G core network and a data radio bearer, as well as marking the quality-of-service flow identifier in uplink and downlink packets. In telecommunications, bearer service or data service may be a service that allows transmission of information signals between network interfaces. These services give the subscriber the capacity required to transmit appropriate signals between certain access points, i.e., user network interfaces.

Virtual network function module 120 may activate processing network data and control protocol data units. Virtual network function module 120 may activate respective list of RLC channels for selective point-in time data copy for application data. Virtual network function module 120 may create data traffic channels. Virtual network function module 120 may open RLC channels from user device 110 and may issue application binding associated with the respective RLC channels. Virtual network function module 120 may initiate a thin device driver layer in user device 110 that will have knowledge of applications 114 and the RLC channel mapping for applications 114.

In step 204, virtual network function module 120 allocates one or more RLC channels to applications 114 in user device 110. Virtual network function module 120 may allocate multiple RLC channels to applications 114 for dedicated packet routing requirements. Virtual network function module 120 may use multiple RLC channels to determine snapshots on the data grains at the virtual network function of network 108. Virtual network function module 120 may control the selective elements in applications 114 that participate into the remote snapshots based on defined policies. Virtual network function module 120 may identify the snapshot requirements at network 108 (e.g., an internal 5G core cloud network). Virtual network function module 120 may remove the starvation of the important application data traffic as correct set of data is moved to the edged cloud with correct snapshot requirements. Virtual network function module 120 may provide user experience with storage space saving in network 108 (e.g., an 5G core cloud network). Virtual network function module 120 may enable a user defined way to control the edged computing benefited for applications 114. Virtual network function module 120 may control the selective elements that participate into the remote snapshots based on defined policies. Virtual network function module 120 may selectively control the data to the internal elements managed by virtual network functions which has no access over radios. Virtual network function module 120 may allocate multiple RLC channels to applications 114 for dedicated packet routing requirements. Virtual network function module 120 may select RLC channels to get the decision of snapshots (e.g., FlashCopy®) of the data grains at the virtual network function of network 108 (e.g., a 5G telecommunication network). Virtual network function module 120 may keep the allowed list of snapshots enabled channels which are communicating from radio interface and extended to S1 bearer.

In step 206, virtual network function module 120 maps corresponding RLC channels and applications 114 with corresponding identifiers respectively. Virtual network function module 120 may maintain the map of all the logical identifiers for which the application-level snapshot is activated. When any write packet is received by a virtual network function, the write packet may extract the application identifier and the respective RLC channel identifier from the packet headers. Once the channel identifiers are located, these identifiers may be mapped with the local virtual network function data structure for tracking enablement. If the RLC identifier is detected for tracking enablement, then source data may be overwritten with new application data and the original data may be saved to datastore 106. Source and target copies can be used by different applications for different purposes. In this case, as the specific RLC channel is designed to send data to datastore 106, therefore the data tracking is calculated and FlashCopy for respective grains are updated by copy data management system at virtual network function. Additionally, chaining and tracking of the application data may be enabled as the virtual network function may understand the SADP header about the RLC identifier that belongs to the list for which the data needs to be tracked in the dependency chaining. On the other hand, the data which is not important and does not need copy data management may be received on another set of RLC channels. In such cases, the initial (e.g., denoted as T0) data blocks may be discarded, and new data may be saved at the same grain position as earlier without invocation of copy data management system. As the T0 data is not moved to another store, the T0 data saves the storage requirement for datastore 106 that gives space benefits for the remote storage for managing the application data. Additionally, virtual network function module 120 may save computational requirement to manage dependency chaining between the datastore objects during addition/removal of intermediate objects and may improve the effectiveness of virtual network function copy management function with optimization in overall workload using a RLC channel for application write packs.

In step 208, virtual network function module 120 monitors applications 114 that need snapshots. Virtual network function module 120 may manage to trigger, restore, and detail the chain element operations using virtual network function calls. When any application's snapshot is triggered, an empty datastore is created and all further upcoming changes are tracked. Once any new write packet comes to the same application datastore, the old data grain is moved to a copy datastore and the incoming packet data may be written to the original location. Virtual network function module 120 may keep the map of all the logical identifiers for which the application-level snapshot is activated and accordingly may trigger the first (e.g., denoted as T0) data copy management for core/edged clouds when any new write packet is received for the respective application. The end user level instance may manage all the applications 114 that are subscribed to the selective space saving snapshot (e.g., FlashCopy) of applications 114 and routing of the incoming packets to a SDAP layer. When the application packet reaches to the SDAP layer at user device 110, virtual network function module 120 may first check the workload type as read or write. In case the application is writing some data to remote datastore allocation, then the instance in user device 110 enquires the copy management requirement of the application for the received grain-pack. Virtual network function module 120 may keep the application own data structure with the defined policies for certain data having snapshot requirements. This information will be applied in case of application-level radio link control channels. Virtual network function module 120 may apply the application own data structure to application-level RLC channels. In case of a system without a base operating system or installed applications (e.g., BareMetal), virtual network function module 120 may allocate the RLC channels of the packet data to a SDAP along with additional system flag indicating the requirement of the copy management action on the internal cloud systems.

In step 210, virtual network function module 120 creates a copy of a datastore associated with applications 114 based on changes monitored in the applications, in response to an application's snapshot request. Virtual network function module 120 may perform RLC channel selection by applications 114 based on whether an initiated pack write needs data preservation or not. For example, if the data position which is newly written is not important to track the changes, then virtual network function module 120 may perform RLC channel selection with a designated non-trackable RLC channel for the packet. Virtual network function module 120 may submit the packet to the RLC layer with the defined RLC identifier which has setting of not tracking the changes for application-level snapshot (e.g., FlashCopy) at the cloud. Virtual network function module 120 may determine whether applications 114 write information that must be tracked. If virtual network function module 120 determines that applications 114 write information that must be tracked, virtual network function module 120 may wrap the packets with designated RLC headers with defined identifiers for tracking enablement. Upon reception of any write packet, virtual network function module 120 may extract application identifiers and respective RLC channel identifiers from the packet headers. Virtual network function module 120 may map RLC channel identifiers with the local data structure for tracking enablement. Virtual network function module 120 may determine whether a RLC channel identifier matches for tracking enablement. If virtual network function module 120 determines that the RLC channel identifier matches for tracking enablement, virtual network function module 120 may overwrite source data with new application data in datastore 106. Virtual network function module 120 may save the original data to the target data in datastore 106. Virtual network function module 120 may activate data tracking and update respective grains. Virtual network function module 120 may perform copy on write. Virtual network function module 120 may deliver an acknowledge to source datastore 106. In case of BareMetal channel allocation policy, once the message and packet are deceived at the SDAP layer, virtual network function module 120 may select the RLC instance based on the nature of tracking requirement and old data preservation polices submitted to the SDAP layer over platform interfaces.

Figure 3:
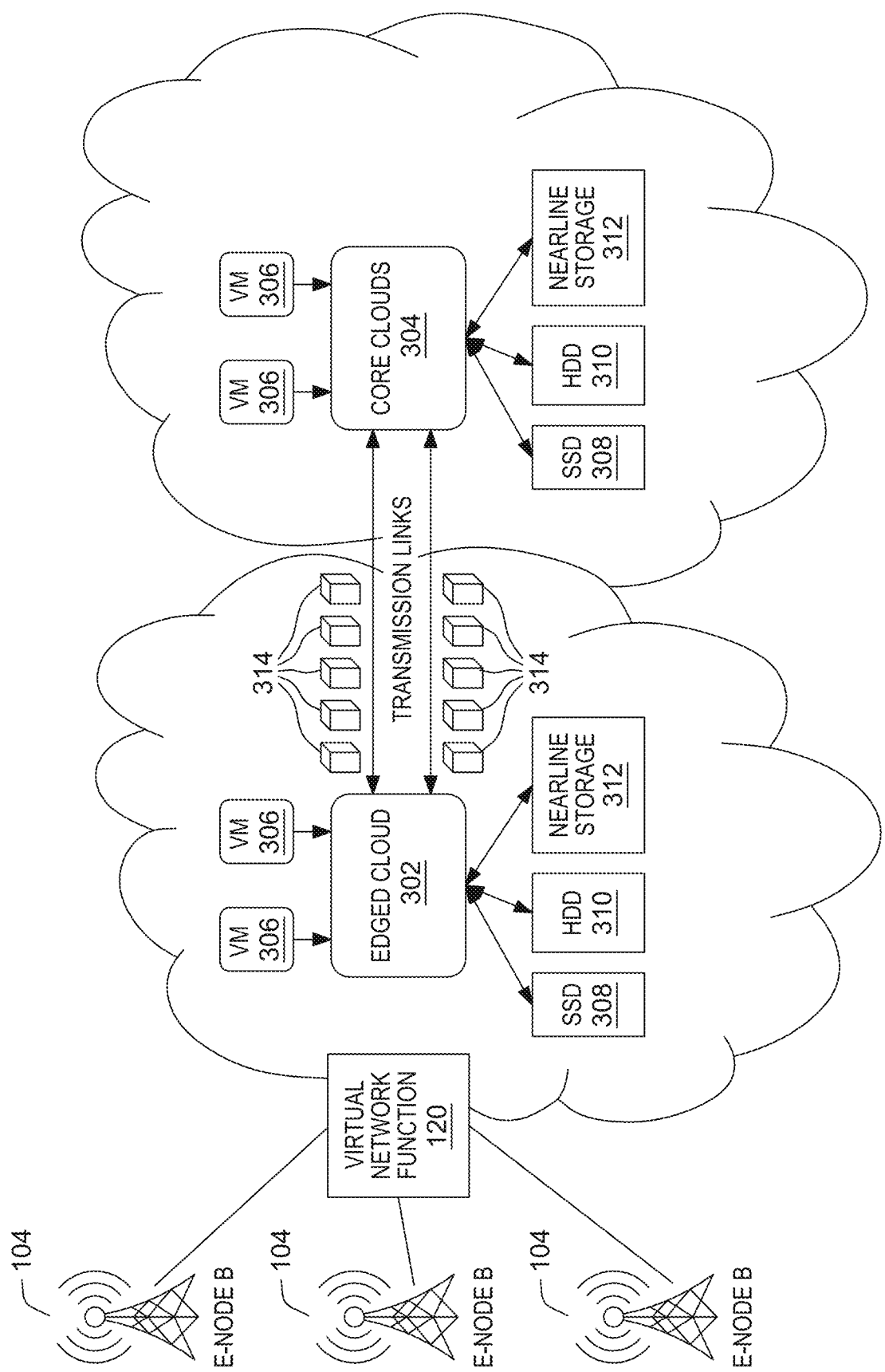
FIG. 3 depicts an exemplary functional diagram of the virtual network function module within the computing device of FIG. 1 in accordance with an embodiment of the present disclosure.

FIG. 3 depicts an exemplary functional diagram of virtual network function module 120 in accordance with the present disclosure.

In the example of FIG. 3, virtual network function module 120 may communicate with base station 104 (denoted as E-Node B), edged cloud 302, and core cloud 304. Virtual machines (VM) 306 may run programs, store data, and connect to edged cloud 302, and core cloud 304. Data 314 may be transmitted between edged cloud 302 and core cloud 304. Data 314 can be stored in datastore 106, for example, in solid state drives (SSD) 308, hard disk drives (HDD) 310, and nearline storage 312.

Figure 4:
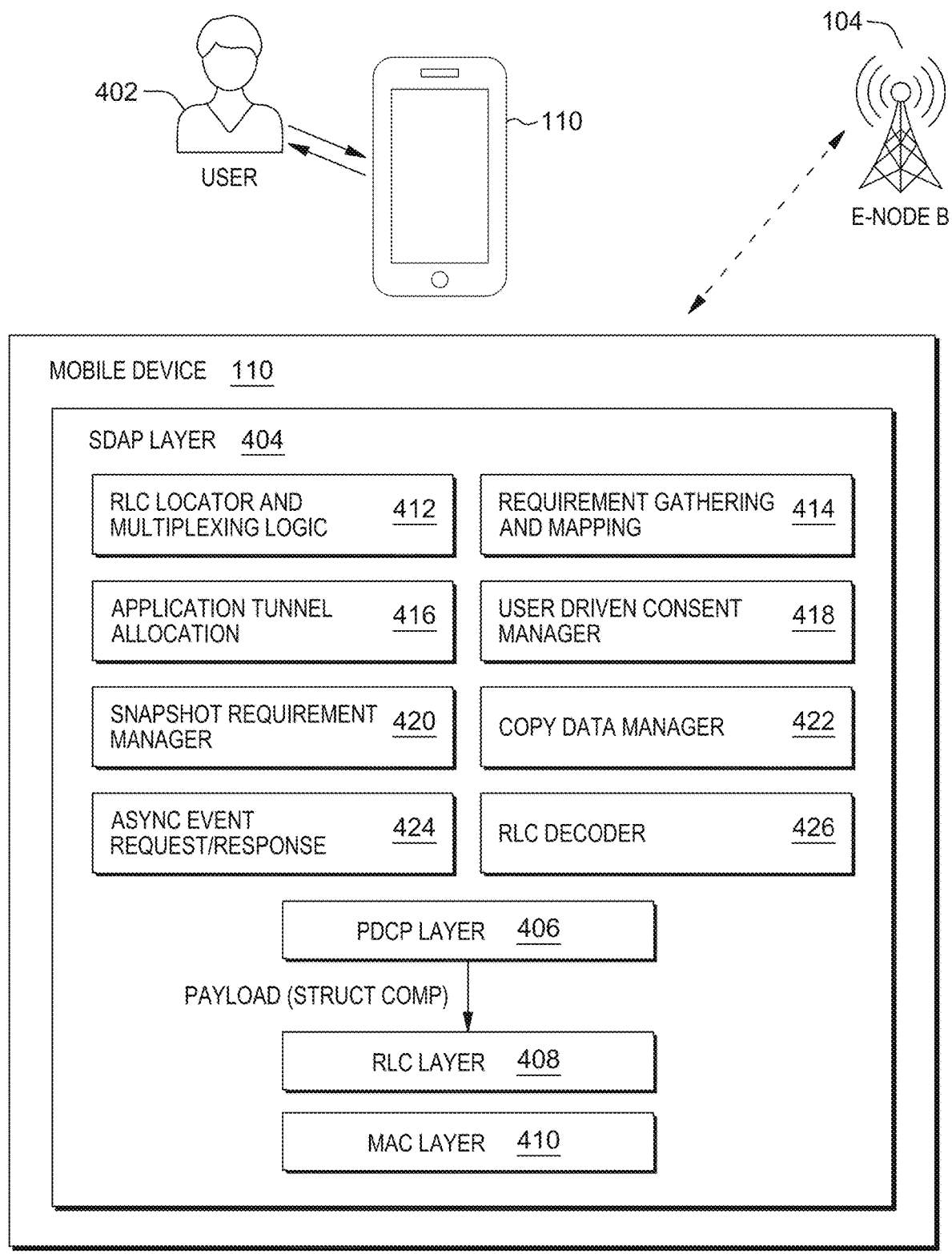
FIG. 4 illustrates an exemplary functional diagram of a user device in accordance with an embodiment of the present disclosure.

FIG. 4 illustrates an exemplary functional diagram of user device 110 in accordance with an embodiment of the present disclosure.

In the example of FIG. 4, user device 110 can be a mobile device used by user 402. User device 110 may include SDAP layer 404, packet data convergence protocol (PDCP) layer 406, RLC layer 408, and media access control (MAC) layer 410. SDAP layer 404 may include RLC locator and multiplexing logic 412, requirement gathering and mapping 414, application tunnel allocation 416, user driven consent manager 418, snapshot requirement manager 420, copy data manager 422, async event request/response 424, and RLC decoder 426.

Figure 5:
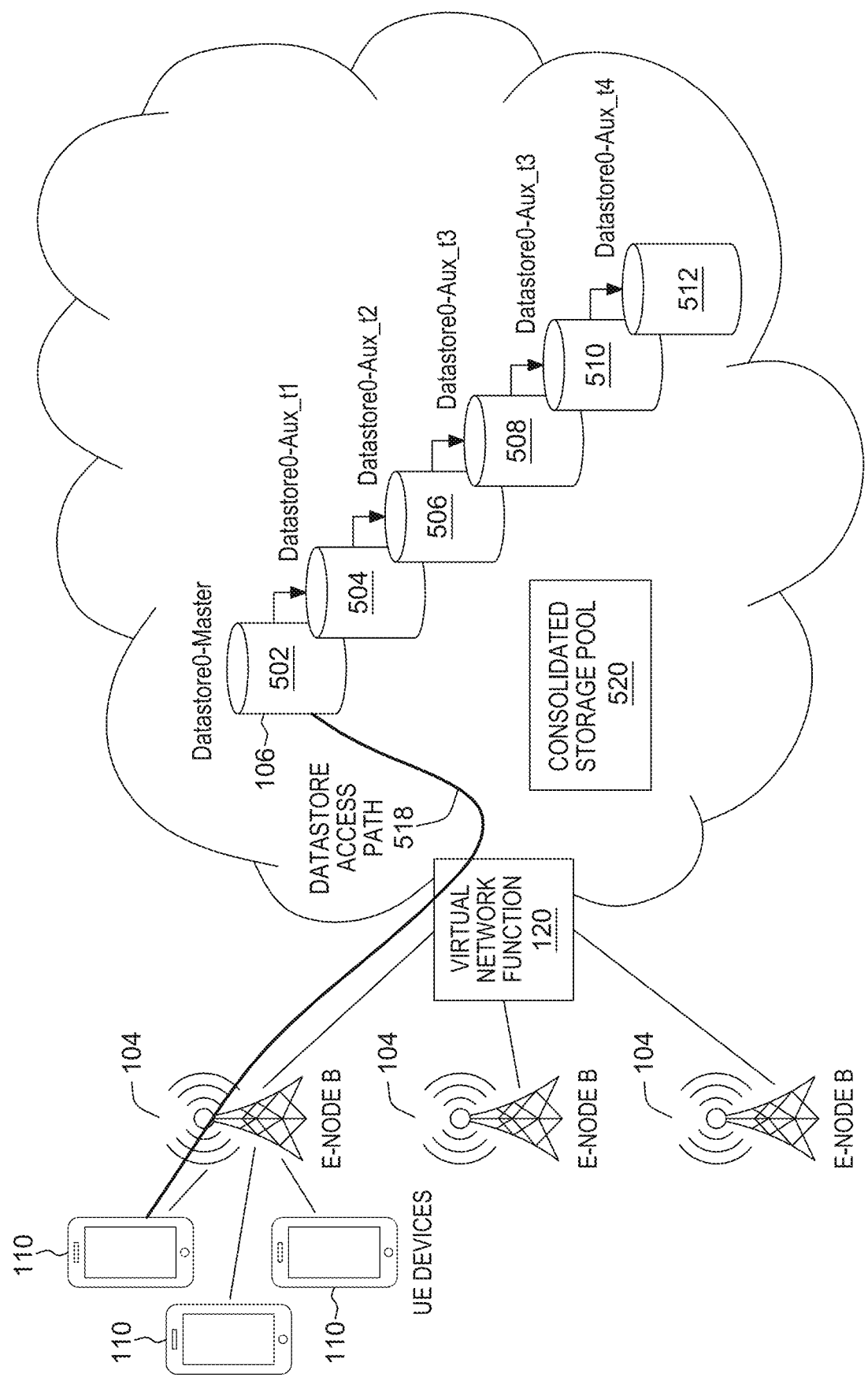
FIG. 5 illustrates an exemplary functional diagram of a datastore in accordance with an embodiment of the present disclosure.

FIG. 5 illustrates an exemplary functional diagram of datastore 106 in accordance with an embodiment of the present disclosure.

In the example of FIG. 5, user device 110 may have datastore access paths to datastore 106. In an example, datastore 106 (e.g., consolidated storage pool 520) can be illustrated to include datastore0-master 502, datastore0-aux_t1 504, datastore0-aux_t2 506, datastore0-aux_t3 508, datastore0-aux_t4 510, datastore0-aux_t5 512, and more.

Figure 6:
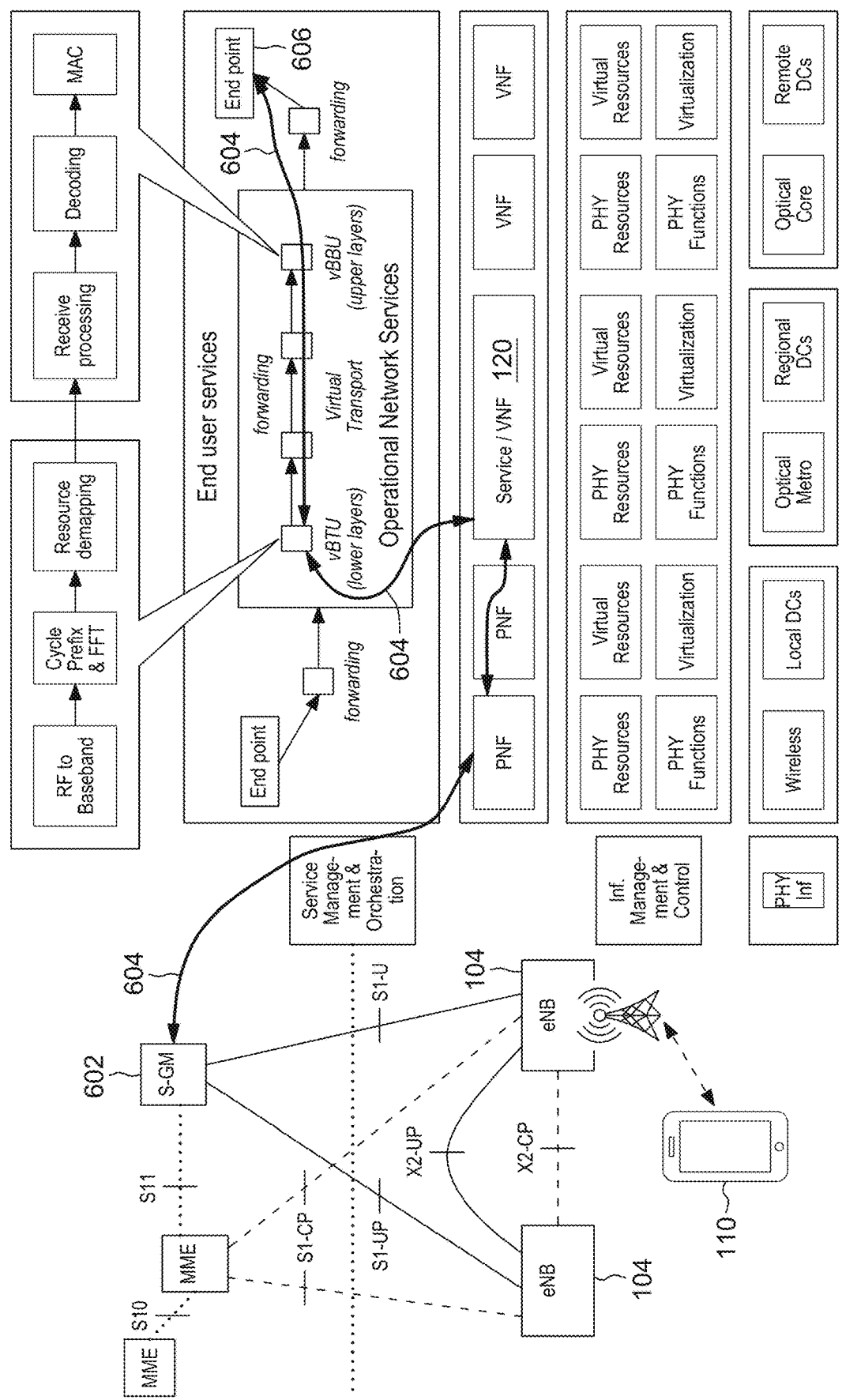
FIG. 6 illustrates an exemplary service path of the virtual network function module within the computing device of FIG. 1 in accordance with an embodiment of the present disclosure.

FIG. 6 illustrates an exemplary service path of virtual network function module 120 in accordance with an embodiment of the present disclosure. FIG. 6 illustrates an access path from user device 110 to base station 104, from base station 104 to service gateway (S-GW) 602. FIG. 6 also illustrates service path 604 from S-GW 602 to virtual network function module 120 to end point 606.

Figure 7:
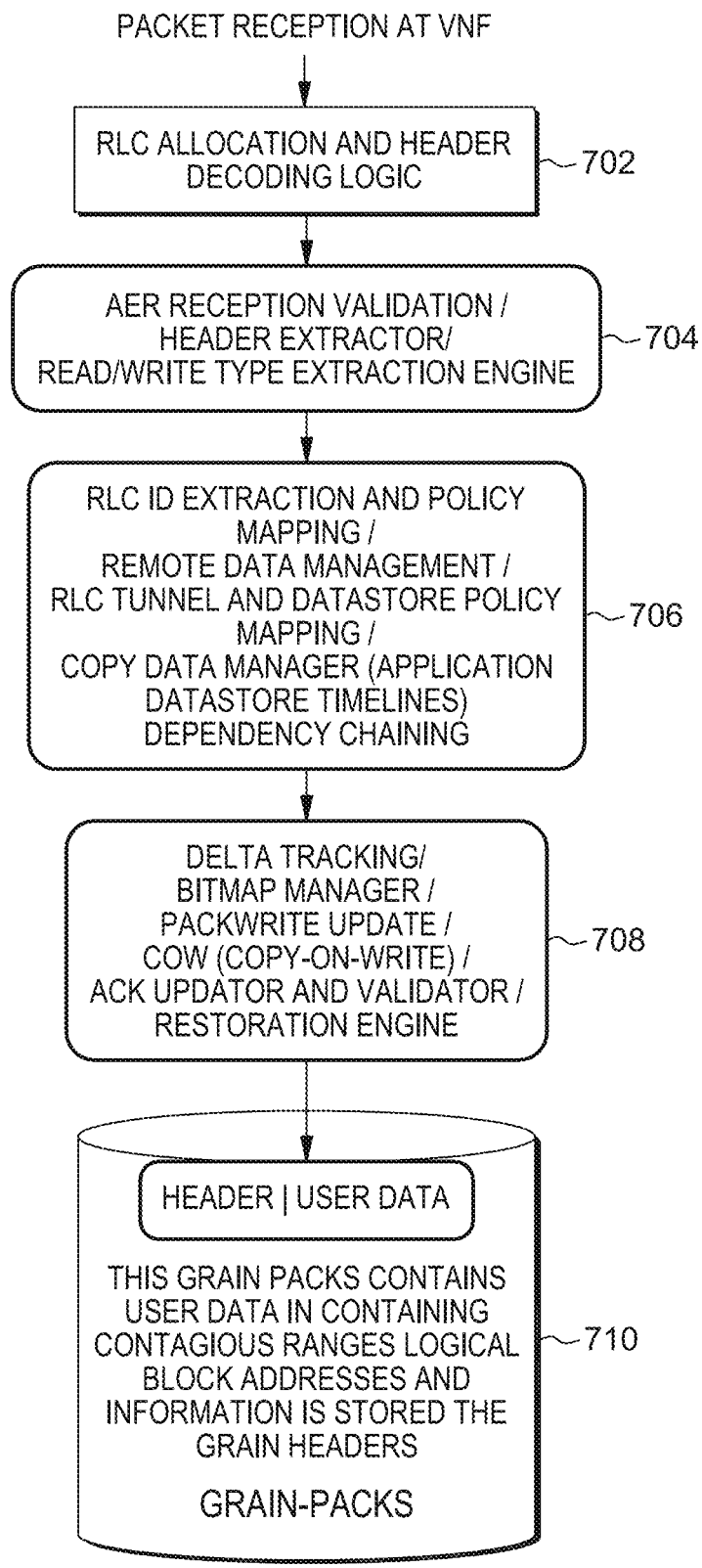
FIG. 7 illustrates an exemplary functional diagram of the virtual network function module within the computing device of FIG. 1 in accordance with an embodiment of the present disclosure.

FIG. 7 illustrates an exemplary functional diagram of virtual network function module 120 in accordance with an embodiment of the present disclosure.

In the example of FIG. 7, in block 702, virtual network function module 120 may allocate RLC channels upon a packet reception. Virtual network function module 120 may perform a header decoding logic. In block 704, virtual network function module 120 may validate async event response. Virtual network function module 120 may extract the header of the packet. Virtual network function module 120 may extract the read/write type information of the packet. In block 706, virtual network function module 120 may extract RLC identifiers and perform policy mapping. Virtual network function module 120 may perform remote data management. Virtual network function module 120 may RLC tunnel and datastore policy mapping. Virtual network function module 120 may perform data copy management based on the application datastore timelines and dependency chaining. In block 708, virtual network function module 120 may perform delta tracking. Virtual network function module 120 may perform bitmap management. Virtual network function module 120 may perform pack-write update. Virtual network function module 120 may perform copy-on-write. In block 710, user data may contain contagious ranges. Logical addresses and information may be stored in the grain headers.

Figure 8:
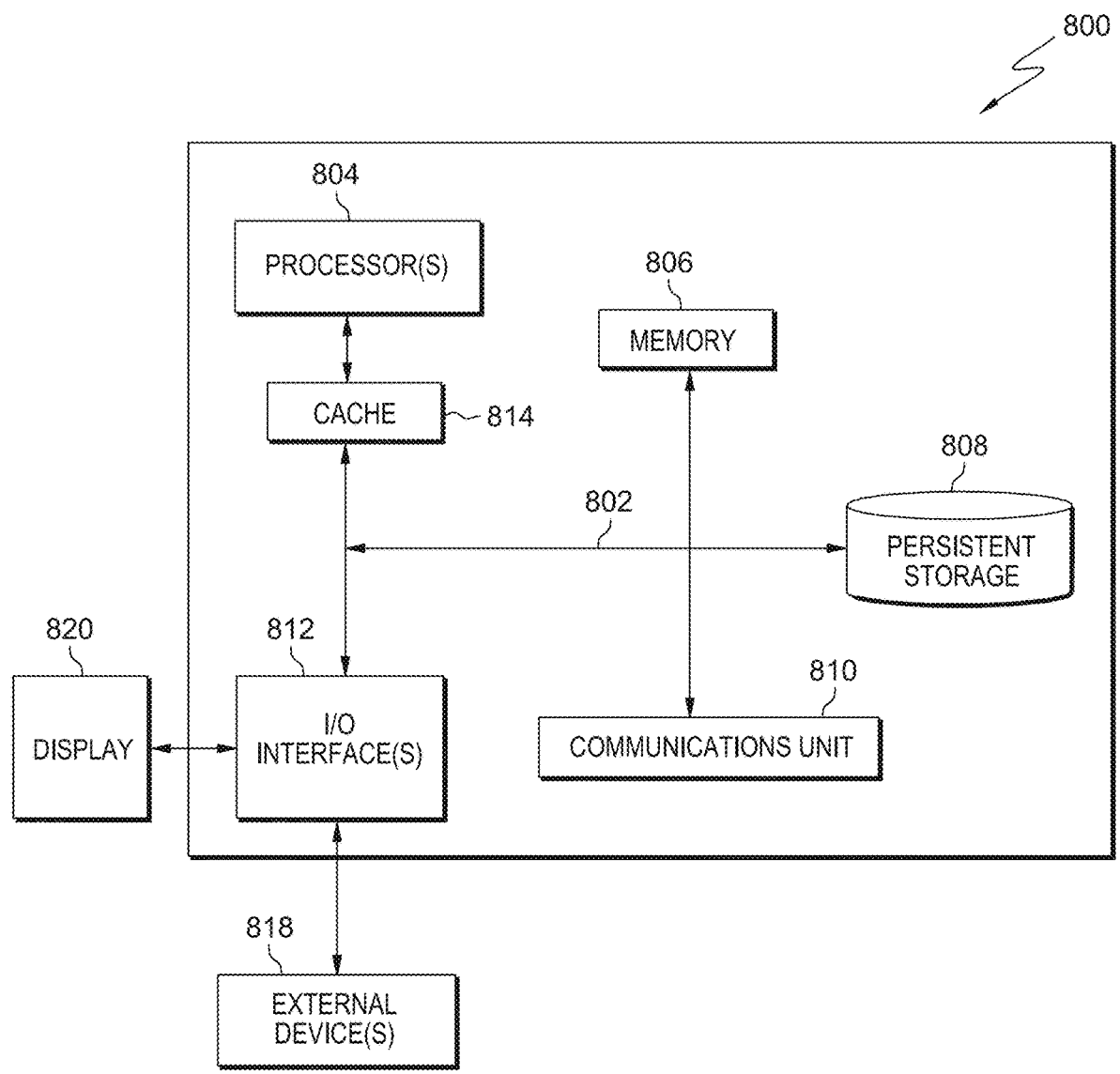
FIG. 8 is a block diagram of components of the user device and the computing device of FIG. 1 in accordance with an embodiment of the present disclosure.

FIG. 8 depicts a block diagram 400 of components of computing device 102 and user device 110 in accordance with an illustrative embodiment of the present disclosure. It should be appreciated that FIG. 8 provides only an illustration of one implementation and does not imply any limitations with regard to the environments in which different embodiments may be implemented. Many modifications to the depicted environment may be made.

Computing device 102 and user device 110 may include communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Virtual network function module 120 may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Virtual network function module 120 may be downloaded to persistent storage 808 through communications unit 810.

I/O interface(s) 812 allows for input and output of data with other devices that may be connected to computing device 102 and user device 110. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., virtual network function module 120 can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
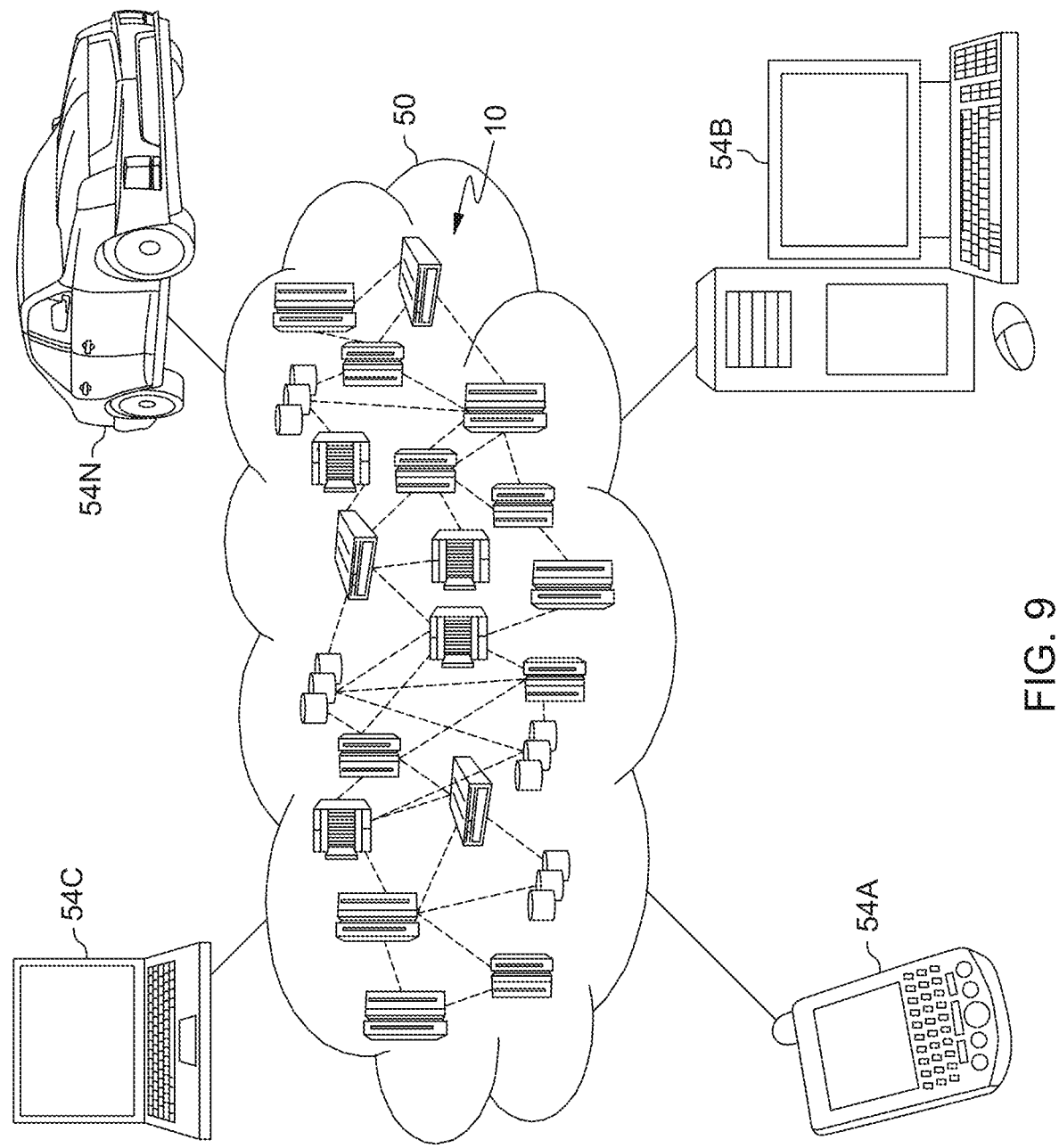
FIG. 9 depicts an embodiment of a cloud computing environment in accordance with the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
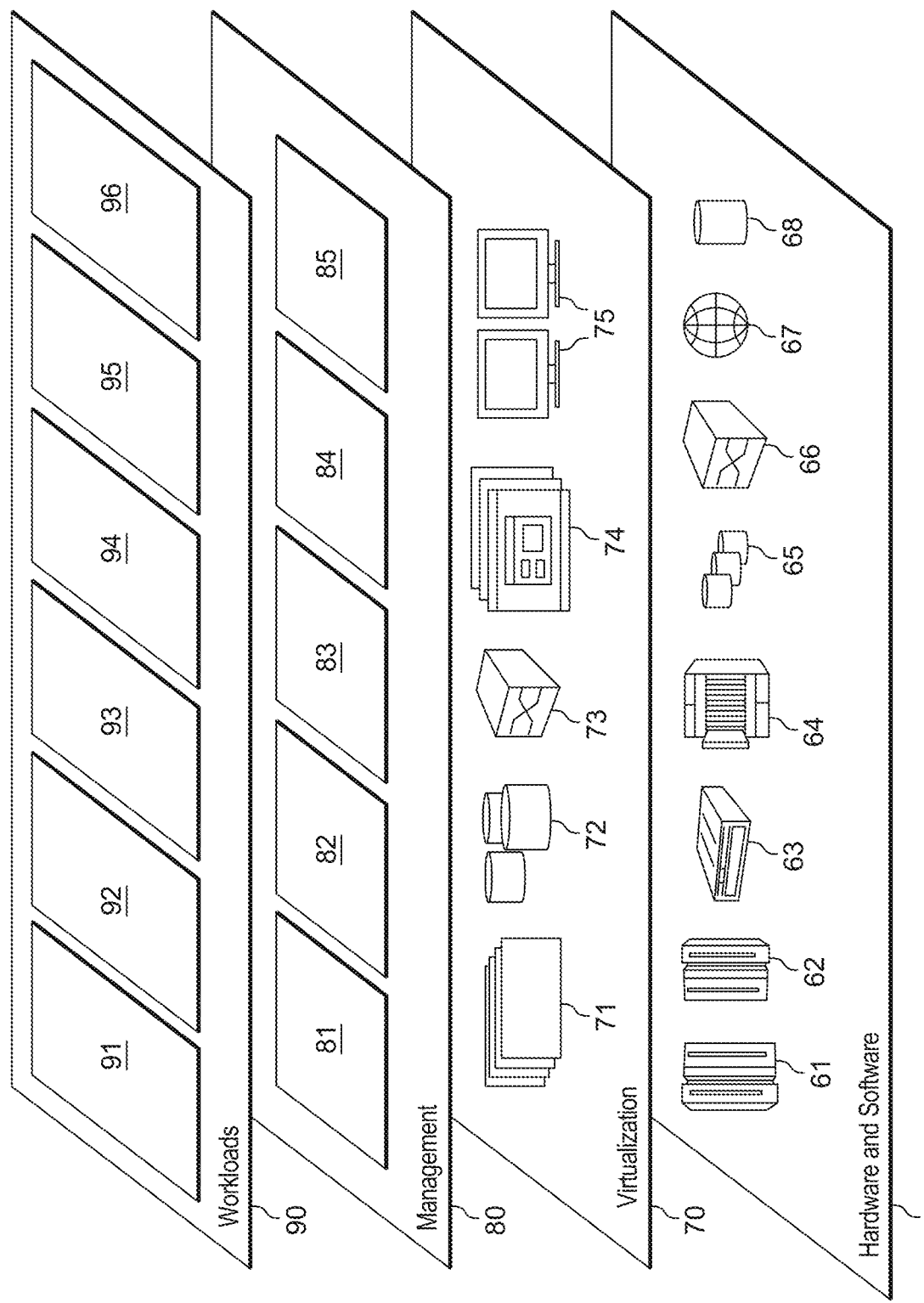
FIG. 10 depicts an embodiment of abstraction model layers of a cloud computing environment, in accordance with the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, virtual network function module 120 as described above with respect to edged cloud application backup environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
    creating, by one or more processors, one or more radio link control (RLC) channels to transfer network data packets in a telecommunication network using a network slicing technology;
    allocating, by one or more processors, the one or more RLC channels to one or more applications in a user device for dedicated packet routing requirements;
    mapping, by one or more processors, corresponding RLC channels and applications with corresponding identifiers, respectively;
    monitoring, by one or more processors, the one or more applications for backups; and
    in response to receiving an application's backup request, creating, by one or more processors, a copy of a datastore associated with the application based on changes monitored in the one or more applications.

2. The computer-implemented method of claim 1, wherein the one or more RLC channels are logical channels of virtualized communication network interfaces that are used to transfer input/output commands and control instructions, the logical channels carrying a traffic from the user device to the telecommunication network in parallel.

3. The computer-implemented method of claim 1, wherein mapping the corresponding RLC channels and applications comprises maintaining the map of all the corresponding identifiers for which an application-level snapshot is activated.

4. The computer-implemented method of claim 1, wherein monitoring the one or more applications comprises:
    maintaining an allowed list of snapshot enabled channels from the one or more RLC channels which are communicating from a radio interface and a bearer, and
    controlling selective elements in the one or more applications that participate into snapshots based on a defined policy.

5. The computer-implemented method of claim 1, further comprising:
    performing, by one or more processors, a RLC channel selection based on whether a data packet needs data preservation.

6. The computer-implemented method of claim 1, further comprising:
    in response to receiving a write data packet, extracting, by one or more processors, an application identifier and respective RLC channel identifier from a packet header;
    determining, by one or more processors, that the respective RLC channel identifier matches the application identifier for tracking enablement; and
    overwriting, by one or more processors, source data with new application data in the datastore.

7. The computer-implemented method of claim 6, further comprising:
- performing, by one or more processors, a copy-on-write on the source data; and
- delivering, by one or more processors, an acknowledgement to a source datastore.

8. A computer program product comprising:
- one or more computer readable storage media, and program instructions collectively stored on the one or more computer readable storage media, the program instructions comprising:
- program instructions to create one or more RLC channels to transfer network data packets in a telecommunication network using a network slicing technology;
- program instructions to allocate the one or more RLC channels to one or more applications in a user device for dedicated packet routing requirements;
- program instructions to map corresponding RLC channels and applications with corresponding identifiers, respectively;
- program instructions to monitor the one or more applications for backups; and
- program instructions to, in response to receiving an application's backup request, create a copy of a datastore associated with the application based on changes monitored in the one or more applications.

9. The computer program product of claim 8, wherein the one or more RLC channels are logical channels of virtualized communication network interfaces that are used to transfer input/output commands and control instructions, the logical channels carrying a traffic from the user device to the telecommunication network in parallel.

10. The computer program product of claim 8, wherein program instructions to map the corresponding RLC channels and applications comprise program instructions to maintain the map of all the corresponding identifiers for which an application-level snapshot is activated.

11. The computer program product of claim 8, wherein program instructions to monitor the one or more applications comprise:
- program instructions to maintain an allowed list of snapshot enabled channels from the one or more RLC channels which are communicating from a radio interface and a bearer, and
- program instructions to control selective elements in the one or more applications that participate into a snapshots based on a defined policy.

12. The computer program product of claim 8, further comprising:
- program instructions to perform a RLC channel selection based on whether a data packet needs data preservation.

13. The computer program product of claim 8, further comprising:
- program instructions to, in response to receiving a write data packet, extract an application identifier and respective RLC channel identifier from a packet header;
- program instructions to determine that the respective RLC channel identifier matches the application identifier for tracking enablement; and
- program instructions to overwrite source data with new application data in the datastore.

14. The computer program product of claim 8, further comprising:
- program instructions to perform a copy-on-write on the source data; and
- program instructions to deliver an acknowledgement to a source datastore.

15. A computer system comprising:
- one or more computer processors, one or more computer readable storage media, and program instructions stored on the one or more computer readable storage media for execution by at least one of the one or more computer processors, the program instructions comprising:
- program instructions to create one or more RLC channels to transfer network data packets in a telecommunication network using a network slicing technology;
- program instructions to allocate the one or more RLC channels to one or more applications in a user device for dedicated packet routing requirements;
- program instructions to map corresponding RLC channels and applications with corresponding identifiers, respectively;
- program instructions to monitor the one or more applications for backups; and
- program instructions to, in response to receiving an application's backup request, create a copy of a datastore associated with the application based on changes monitored in the one or more applications.

16. The computer system of claim 15, wherein the one or more RLC channels are logical channels of virtualized communication network interfaces that are used to transfer input/output commands and control instructions, the logical channels carrying a traffic from the user device to the telecommunication network in parallel.

17. The computer system of claim 15, wherein program instructions to map the corresponding RLC channels and applications comprise program instructions to maintain the map of all the corresponding identifiers for which an application-level snapshot is activated.

18. The computer system of claim 15, wherein program instructions to monitor the one or more applications comprise:
- program instructions to maintain an allowed list of snapshot enabled channels from the one or more RLC channels which are communicating from a radio interface and a bearer, and
- program instructions to control selective elements in the one or more applications that participate into snapshots based on a defined policy.

19. The computer system of claim 15, further comprising:
- program instructions to perform a RLC channel selection based on whether a data packet needs data preservation.

20. The computer system of claim 15, further comprising:
- program instructions to, in response to receiving a write data packet, extract an application identifier and respective RLC channel identifier from a packet header;
- program instructions to determine that the respective RLC channel identifier matches the application identifier for tracking enablement; and
- program instructions to overwrite source data with new application data in the datastore.

\* \* \* \* \*